United States Patent Office.

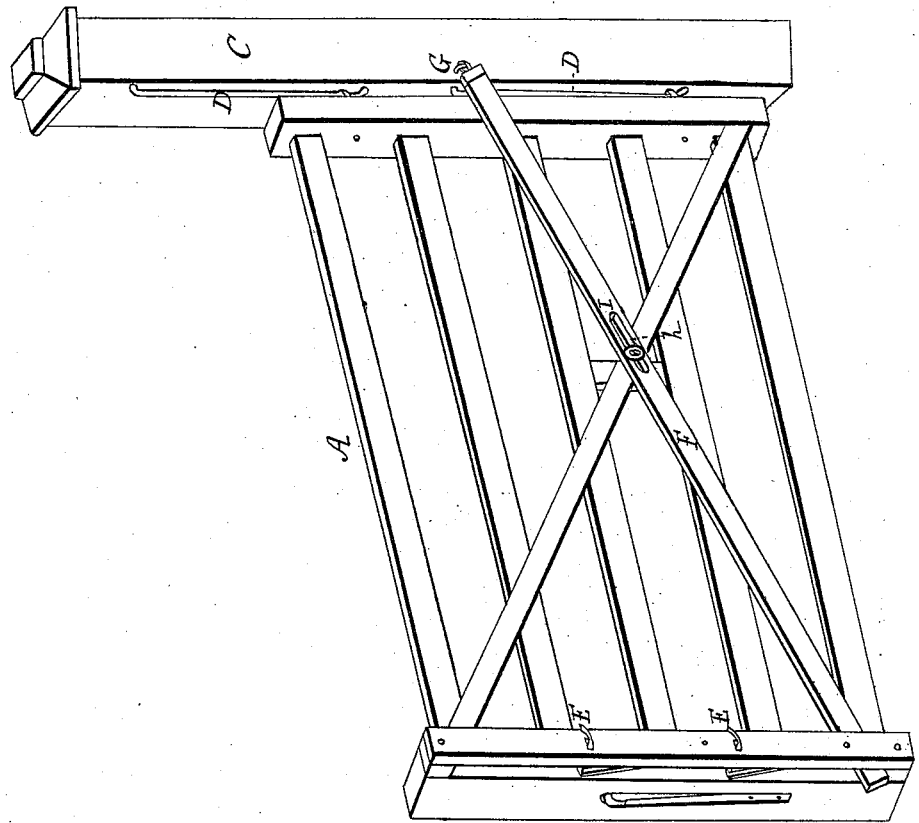

FRANK LIVINGSTON, OF MARATHON, NEW YORK.

Letters Patent No. 76,931, dated April 21, 1868.

IMPROVEMENT IN GATES.

The Schedule referred to in these Letters Patent and making part of the same.

TO ALL WHOM IT MAY CONCERN:

Be it known that I, FRANK LIVINGSTON, of Marathon, in the county of Cortland, and State of New York, have invented a new and useful Improvement in Gates; and I do hereby declare that the following is a full, clear, and exact description of the construction and operation of the same, reference being had to the accompanying drawings, making a part of this specification.

The object of my invention is to provide a swing-gate which may be readily raised or lowered, to accommodate itself to snow or other obstructions.

A is any ordinary gate, swinging between the posts B and C, and hung upon the long hinges D D', so that the gate may be raised or lowered thereon. F is a long bar or lever, extending lengthwise of the gate, and hinged to the gate-post C at G. At or near the centre of this bar is a pivot, h, firmly fixed in the gate, and extending through a slot, I, in the bar, and upon which pivot the bar turns or slides readily. This bar is used as a lever, and is the means by which the gate is lowered or raised upon its hinges, being operated at that end of the gate which swings; and when the gate is raised or lowered to the desired point, the bar or lever is held in place by springs or pins in the gate e e'. As the gate swings, the bar F swings with it, the slot in the bar allowing of any movement in the bar which may be necessary, in consequence of the bar and gate swinging from different centres. Such slot also allows of the free upward and downward movement of the lever upon the pivot, and allows the change of fulcrum as becomes necessary.

What I claim, and desire to secure by Letters Patent, is—

The bar F, hinged and pivoted as described, in combination with the gate and sliding hinges D D, for the uses and purposes set forth.

FRANK LIVINGSTON.

Witnesses:
  CHAS. FOSTER,
  B. B. WOODWORTH.